July 29, 1969

V. A. RAYBURN 3,457,640

METHODS OF FABRICATING AN ELECTRICAL COUPLER

Filed Dec. 17, 1964

INVENTOR.
V. A. RAYBURN
BY
ATTORNEY

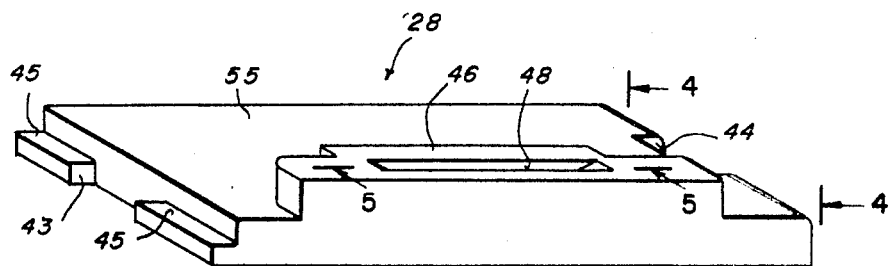
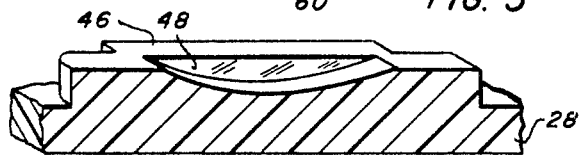
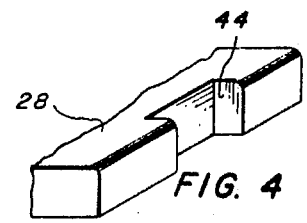
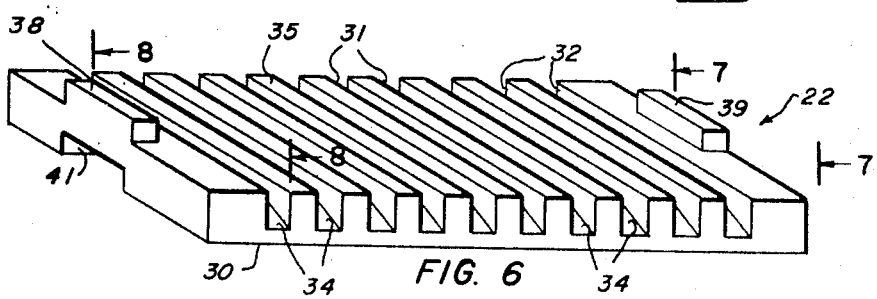
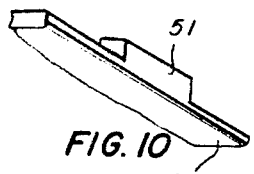
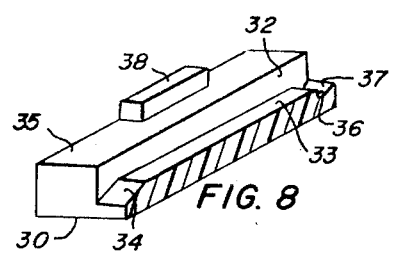
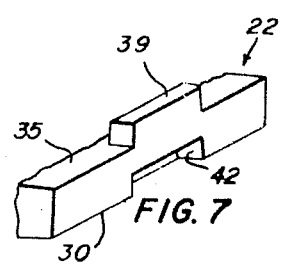
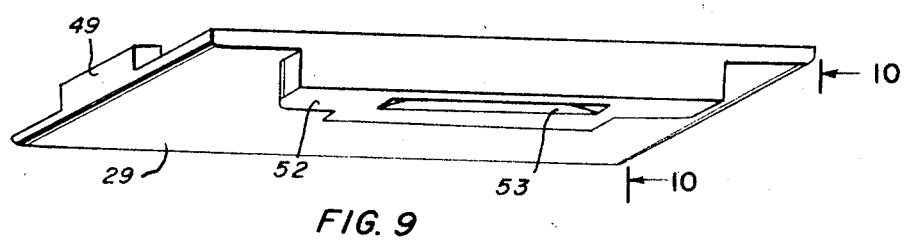

July 29, 1969  V. A. RAYBURN  3,457,640
METHODS OF FABRICATING AN ELECTRICAL COUPLER
Filed Dec. 17, 1964  6 Sheets-Sheet 6

United States Patent Office 3,457,640
Patented July 29, 1969

3,457,640
METHODS OF FABRICATING AN ELECTRICAL COUPLER
Vincent A. Rayburn, Baltimore, Md., assignor to Western Electric Company Incorporated, New York, N.Y., a corporation of New York
Filed Dec. 17, 1964, Ser. No. 418,995
Int. Cl. H01r 9/00, 5/00
U.S. Cl. 29—629             5 Claims

ABSTRACT OF THE DISCLOSURE

In the fabrication of an electrical coupler unit a plurality of wafers are stacked so that open slots of each of the wafers form contactor-receiving cells with surfaces of adjacent wafers. A plurality of contactors are stamped from a metal strip and are held commonly in a spaced relation by a backbone of the strip which remains attached to each contactor after the stamping operation. The backbone-held contactors are inserted into the cells formed by the stacked wafers and the backbone is flexed so that the backbone breaks away from each contactor thereby leaving each contactor individually supported within an associated one of the contactor-receiving cells.

BACKGROUND OF THE INVENTION

Field of the invention

This invention relates to methods of fabricating an electrical coupler, and particularly to methods of fabricating a symmetrical, laminated, color-coded coupler and assembling a mass unit of contactors in the coupler.

Description of prior art

A standard color-coded telephone cable is described in United States Patent No. 3,031,524, issued in the name of W. T. Hicks on Apr. 24, 1962, and discloses in one embodiment a single unit cable consisting of 25 distinctive pairs of conductors. In many instances multiples of such unit cables are combined to form a multiple unit group, wherein each unit cable is lashed with a pair of different colored binder tapes, In addition, the color-code combination of each pair of binder tapes for respective unit cables are formed from a different color combination relative to the remaining pairs of color-coded binder tapes wrapped about the remaining unit cables. In this manner, the respective unit cables of a multiple unit group are clearly disinguishable from the remaining unit cables of the group. The unit cables and the multiple unit groups are thereafter utilized for interconnecting a plurality of subscriber sets with central office facilities. Presently, the cable is manufactured and delivered to an installation group for installing the cable in either aerial or underground conduits and for hand splicing individual conductors of the cable with conductor ends of other such cables or other types of terminations.

With the increasing volume of subscriber service in the telephony field, considerable time and effort is required by an installation group to hand splice the conductors of the cables for connection with other cables or terminations. Additional effort is necessitated to insure proper connection between similarly color-coded twisted pairs of unit cables being connected together as well as to insure the connecting of unit cables having the same color-coded binder tapes wherein the unit cables form portions of separate multiple unit groups. Hence, a need for simplifying and hastening cable connecting and terminating operations is apparent, wherein the color coding must be retained.

Additionally, where the cable is installed in conduits, coupling facilities must be sufficiently compact to permit pulling them through such conduits.

SUMMARY OF THE INVENTION

It is, therefore, an object of the invention to provide new and improved methods of fabricating a compact multiple-contact coupler for simplifying and fastening cable connecting and terminating operations.

Another object of the invention is the provision of new and improved methods of fabricating a multiple-contact, color-coded, laminated coupler for connecting corresponding unit cables while maintaining color identification throughout.

Still another object of the invention is the provision of new and improved methods of fabricating a multiple-contact, laminated, color-coded coupler having different colored wafers corresponding to a color code used with a cable to facilitate interconnecting color-coded cables.

A still further object of the invention is the provision of new and improved methods of fabricating the coupler contactors in such a manner that a plurality of the contactors are held in a spaced relation during a conductor-assembly operation and subsequent assembly of the contactors in the coupler body.

The present invention contemplates a method of fabricating miniature contactors having conductors secured therewith which includes forming initially a plurality of contactors held by a common support in a side-by-side relation. A conductor is secured with each of the commonly supported contactors and the common support is removed from supporting relation with the contactors to provide individual contactors having conductors secured thereto.

Prior to the removal of the common support, the plurality of contactors having the conductors secured thereto can be inserted into cells of a coupler unit whereby fastening structure of the contactors engages complementary securing structure of the coupler so that the contactors are located in a self-securing manner within the cells of the coupler unit. Subsequent to the securing of the commonly supported contactors within the individual cells of the coupler unit, the common support is removed from the supporting relation with the contactors to reveal an assembly having a plurality of individual contactors self-secured within spaced cells of the coupler unit.

Other objects and advantages of the invention may be readily understood from the following detailed description of a specific embodiment thereof when read in conjunction with the accompanying drawings.

BRIEF DESCRIPTION OF THE DRAWINGS

FIG. 3 is a perspective view showing structural features of one of a pair of side wafers of the laminated coupler unit;

FIG. 4 is a partial end view, taken along line 4—4 of FIG. 3, showing a keeper notch formed in the side wafer;

FIG. 5 is a partial sectional view, taken along line 5—5 of FIG. 3, showing a structural recess formed in the side wafer to provide a grip for facilitating manual removal of the laminated coupler unit from within the band and for further reducing the effects of heat sink during plastic molding of the side wafer;

FIG. 6 is a perspective view showing an intermediate wafer of the laminated coupler unit;

FIG. 7 is a partial end view, taken along line 7—7 of FIG. 6, showing a keeper notch formed in the intermediate wafer, and further showing a keeper lug which cooperates with the notch of the adjacent intermediate wafer for facilitating cooperative positioning, aligning and locking of the wafers in a stacked, laminated configuration;

FIG. 8 is a sectional view, taken along line 8—8 of FIG. 6, showing structural recesses of the intermediate wafer;

FIG. 9 is a perspective view showing the structural features of the second of the pair of side wafers of the laminated coupling unit;

FIG. 10 is a partial end view, taken along line 10—10 of FIG. 9, showing a keeper lug of the side wafer shown in FIG. 9;

FIG. 15 is a closed-end view of a disposable dust cover which is inserted into one end of a band having a coupler unit inserted into the other end and is used to protect tines of coupler contactors during shipment;

FIG. 16 is a perspective view taken along line 16—16 of FIG. 15 showing an open-end view of the dust covers;

DETAILED DESCRIPTION

Figure 1:
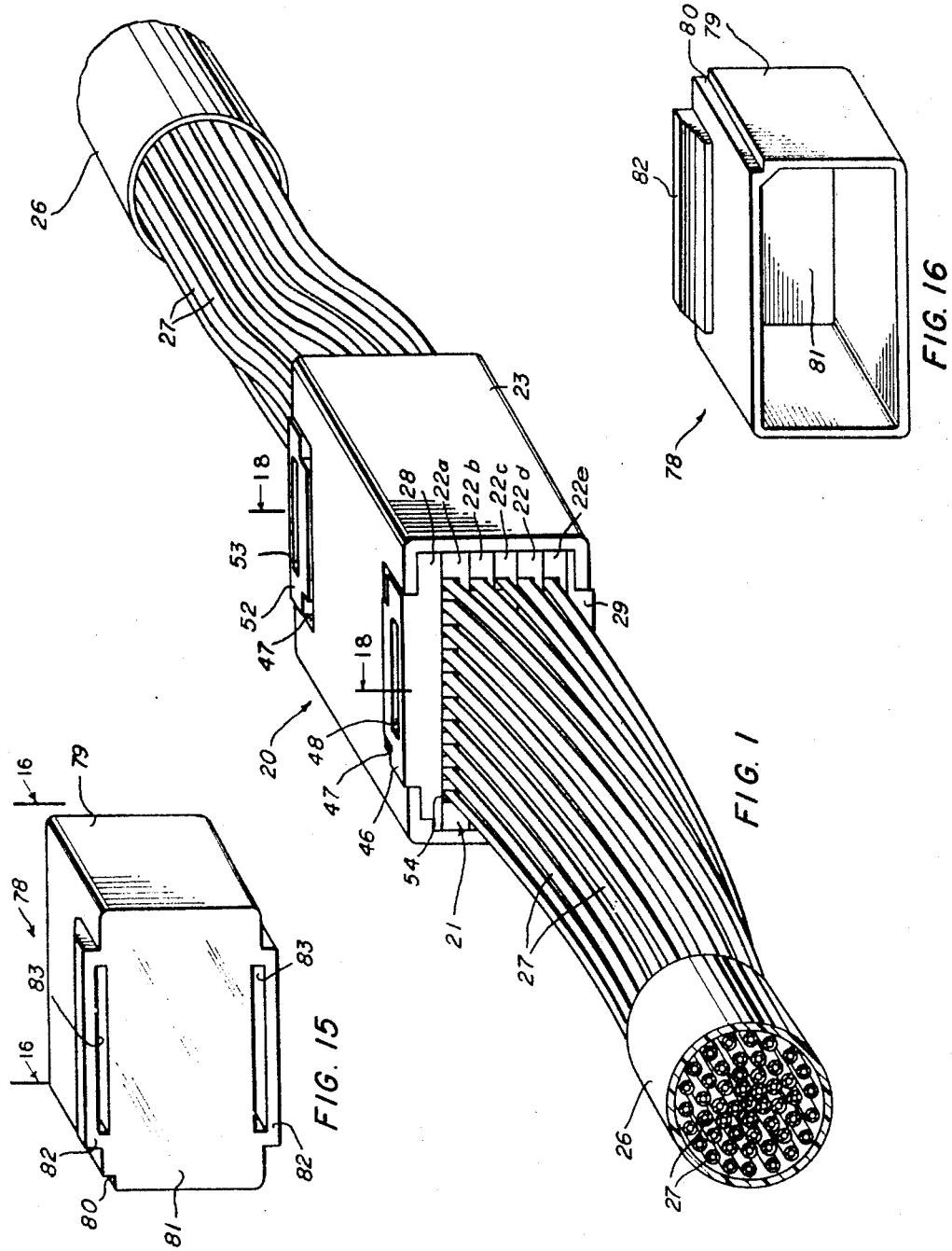
FIG. 1 is a perspective view showing a coupler which includes a pair of symmetrical coupler units assembled with a band for aligning and holding the coupler units in mating engagement.
Figure 2:
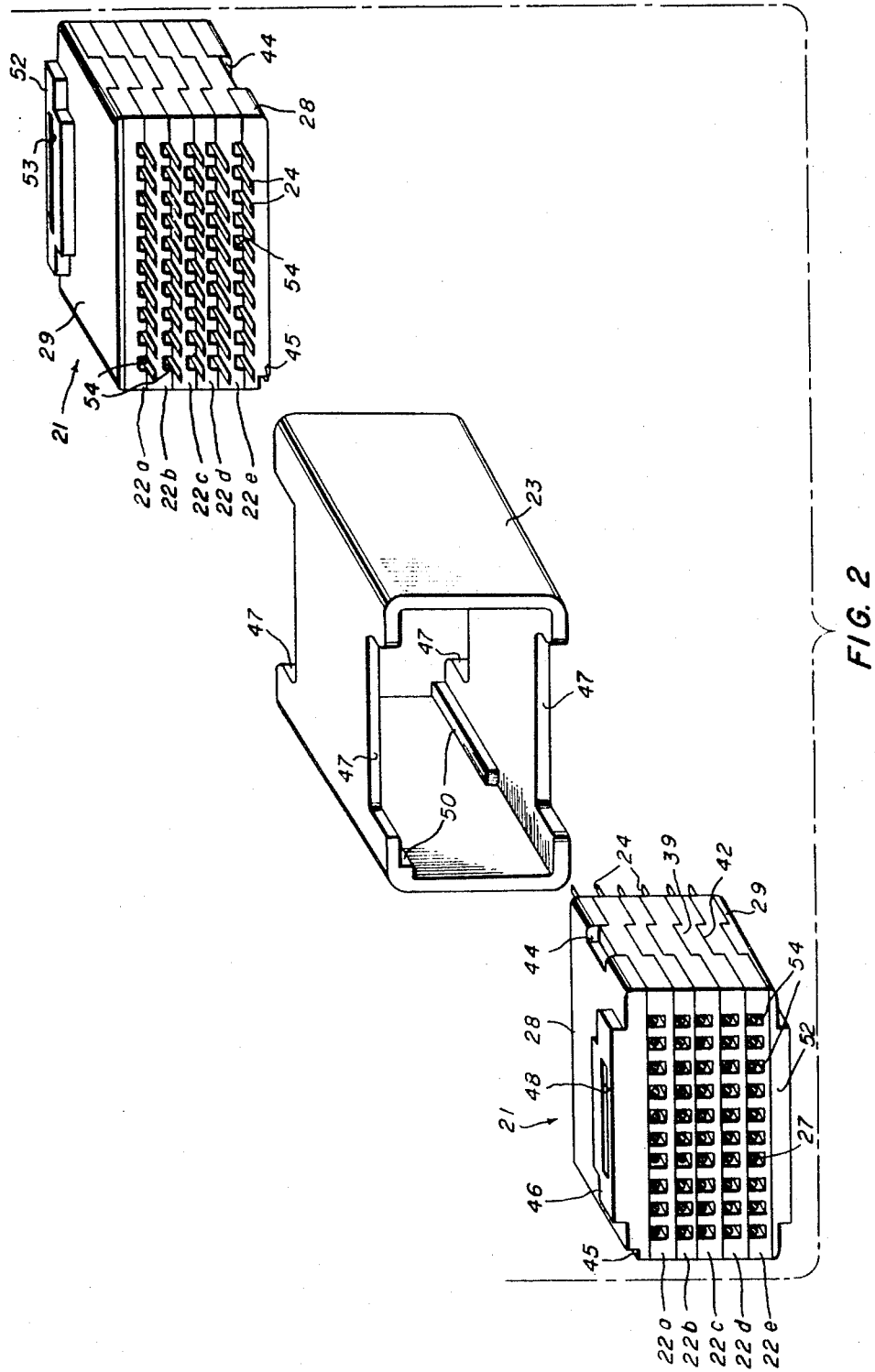
FIG. 2 is an exploded perspective view showing the relationship between the pair of mating coupler units of the coupler and the aligning and locking band.

Referring to FIGS. 1 and 2, a coupler 20 includes a pair of identical, laminated, universally color-coded coupler units, generally designated by the reference numeral 21, which are interlocked and subsequently held together by a plastic band 23. Each coupler unit 21 includes a plurality of different colored, plastic, intermediate wafers 22—22 which are numbered 22a through 22e to designate that each wafer is composed of a different color relative to the other wafers such as blue, orange, green, brown and slate, respectively. Each of the coupler units 21—21 is provided with a plurality of contactors 24—24, which are positioned for mating engagement with the contactors of the opposing coupler unit. The coupler unit 21 may be used in connecting the ends of cables, such as unit cables 26—26, wherein each cable is composed of a plurality of twisted pairs of conductors 27—27 and is substantially similar to the unit cable described in United States Patent No. 3,031,524, issued to W. T. Hicks. An example of the unit cable 26 would include twenty-five twisted pairs of conductors, wherein each of the conductors is individually insulated with a colored insulation material. Ten different pairing colors of insulation material are utilized with two groups of five base colors each, thereby composing twenty-five pairs of fifty conductors which form the unit cable 26. The base code colors to be utilized include a first group of colors such as white, red, black, yellow and violet; and a second group of colors such as blue, orange, green, brown and slate.

TABLE 1

| Pair No. | Conductor "A" | Conductor "B" |
| --- | --- | --- |
| 1 | White | Blue. |
| 2 | do | Orange. |
| 3 | do | Green. |
| 4 | do | Brown. |
| 5 | do | Slate. |
| 6 | Red | Blue. |
| 7 | Red | Orange. |
| 8 | Red | Green. |
| 9 | Red | Brown. |
| 10 | Red | Slate. |
| 11 | Black | Blue. |
| 12 | do | Orange. |
| 13 | do | Green. |
| 14 | do | Brown. |
| 15 | do | Slate. |
| 16 | Yellow | Blue. |
| 17 | do | Orange. |
| 18 | do | Green. |
| 19 | do | Brown. |
| 20 | do | Slate. |
| 21 | Violet | Blue. |
| 22 | do | Orange. |
| 23 | do | Green. |
| 24 | do | Brown. |
| 25 | do | Slate. |

In accordance with a pattern as shown in Table 1, a pair identification system is utilized wherein conductors A and B of each of the twenty-five pairs are insulated with different colored insulation, with each pair having a color combination different from any other color combination of the remaining pairs. In addition, it is to be noted that the base code colors of the first group are utilized on the insulation of the conductors A and the base code colors of the second group are utilized on the insulation of the conductors B.

Further, a pair of different colored binder tapes is helically wrapped about each unit cable 26 which forms a portion of a multiple unit group comprising a plurality of unit cables. Hence, a given unit cable of twenty-five pairs is distinguishable from the remaining unit cables of the group by having a different color combination of pairs of colored binder tapes helically wrapped around respective unit cables of the group. The coupler units 21—21 are composed of the different colored, intermediate wafers 22—22 preassembled between a pair of different colored, side wafers 28 and 29, wherein the colors utilized in the intermediate wafers 22a through 22e conform to the colors used in the insulation of the second group of base code colors such as blue, orange, green, brown and slate, respectively, and the colors of the side wafers conform to the colors of the pair of colored binder tapes helically wrapped around the unit cable 26. In this manner, one unit cable 26 of twenty-five pairs is readily distinguishable from an adjacent unit cable of twenty-five pairs by observing the different color combination of the side wafers 28 and 29 of coupler unit 21.

As viewed in FIGS. 6 through 8, 17 and 18, each of the individual, intermediate wafers 22—22 is generally of a flat and rectangular configuration and is formed with a flat face 30 on one major surface thereof and on the opposite major surface 35 with spaced, parallel slots 31 which traverse the short dimension of the rectangular wafer. Each slot 31 is formed with opposed, spaced side walls 32—32 with a flat bed 33 contiguous with and extending between the walls for receiving the contactor 24. A common end of each of the beds 33—33 of the wafer 22 is formed with a downwardly sloped surface 34. The opposite common ends of each of the beds 33—33 of the wafer 22 is formed with a transverse undercut 36 with an upwardly sloped surface 37 extending outwardly therefrom. It is noted that the sloped surface 34 and the undercut 36 facilitate the self-securing of the contactor 24 lengthwise within the slot 31 of the coupler unit 21. In addition, the sloped surface 37 strengthens the walls of the slots 31—31 at the entry end and provides an insulator barrier between adjacent pairs of contactors 24—24 as well as a guide for an entering, mating contactor. Keeper lugs 38 and 39 extend upwardly from opposite ends of the flat, slotted surface 35 of the wafer 22, and conforming keeper notches 41 and 42 are formed in the opposite ends of the other flat surface of the wafer 22 wherein the lugs cooperate with the conforming notches of an adjacent wafer 22 for locking the wafers together to preclude relative lateral sliding movement in any direction.

As further viewed in FIGS. 3, 4 and 5, the side wafer 28 is substantially flat and rectangular with two major flat surfaces 55 and 60. The wafer 28 is formed with through-notches 43 and 44 on opposite ends thereof to facilitate the reception of the keeper lugs 38 and 39 of the adjacent, intermediate wafer 22 to preclude relative lateral sliding movement in any direction. In addition, the flat surface 55 of the side wafer 28 is formed with a projection 46, which fits into a cutaway 47 (FIGS. 1 and 2) of the band 23. The projection 46 of the side wafer 28 is formed with a recess 48 to facilitate a grip for manual handling of the coupler unit 21 relative to the band 23 and also reduce undesirable strain effects resulting from heat sink during the molding of the wafers.

The side wafer 28 is formed with a corner keyway 45 along the edge which is provided with the through-notch 43 and cooperates with one of a pair of corner keys 50—50 (FIG. 2) formed along diagonally opposed corners of a common inner wall of the band 23. It is noted that each of the keys 50—50 extend into the band 23 from respective open ends of the band approximately one-half the distance between the open ends of the band. Hence, as shown in FIG. 2, proper orientation of the mating coupler units 21—21 prior to mating engagement is assured by the cooperation of the corner keys 50—50 on the inner wall of the band 23 and the complementary keyways 45—45 of the side wafers 28—28. Proper alignment of the mating coupler units 21—21 is accomplished by the close sliding fit of the coupler units with the band 23.

As viewed in FIGS. 9 and 10, the side wafer 29 is substantially flat, and is formed at opposite ends of one flat surface with projecting keeper lugs 49 and 51 which are positioned within keeper notches 41 and 42, respectively, of the adjacent, intermediate wafer 22, whereby the side wafer is assembled with the adjacent, intermediate wafer to preclude relative lateral sliding movement in any direction. The side wafer 29 is also formed with a projection 52 extending from the opposite flat surface, wherein the projection is formed with a recess 53 for facilitating handling of the coupler unit 21 relative to the band 23 and to reduce undesirable heat sink effects.

Figure 17:
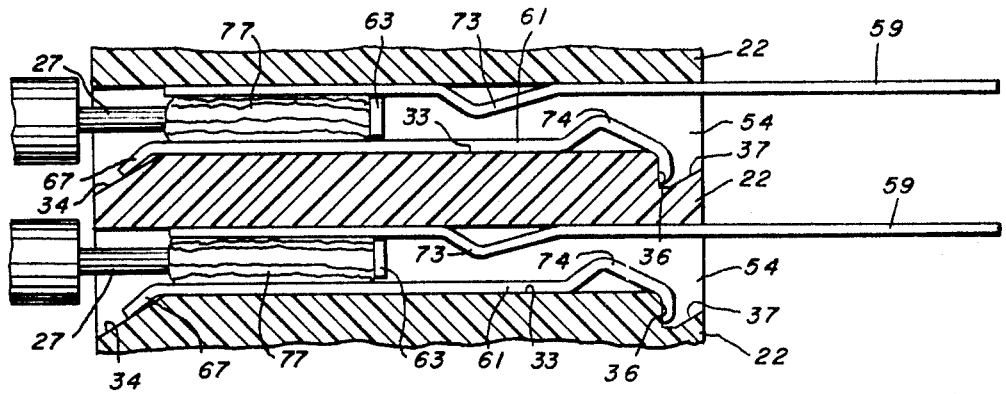
FIG. 17 is a partial sectional view of the contactors assembled in cells of the coupler unit.
Figure 18:
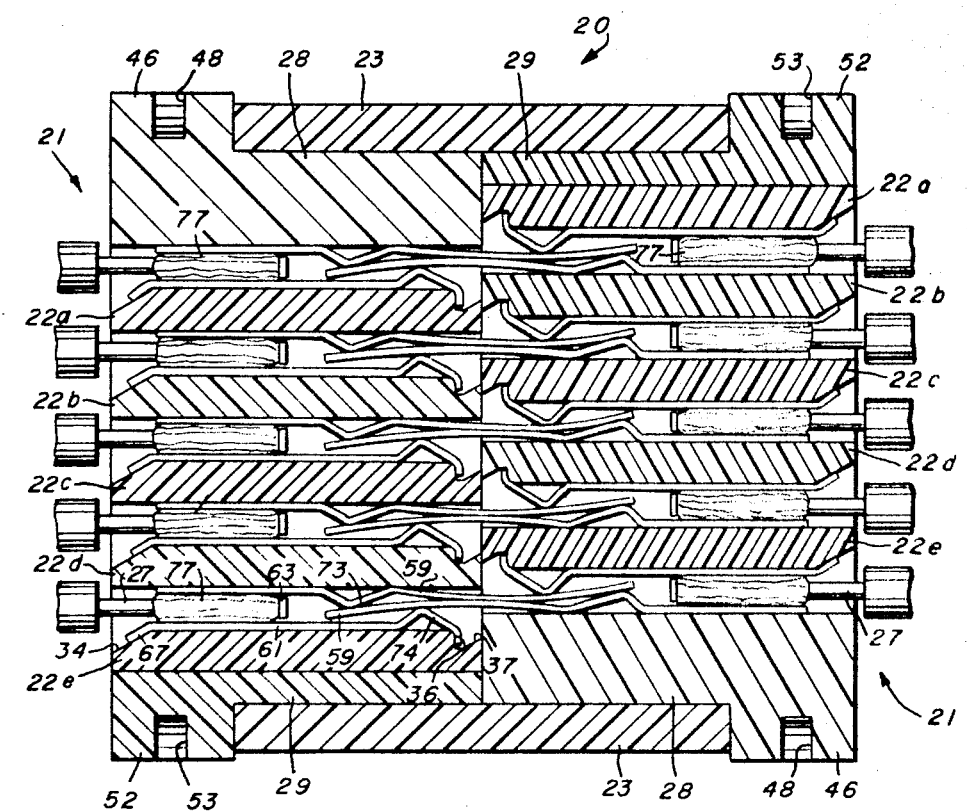
FIG. 18 is a partial sectional view taken along line 18—18 of FIG. 1 showing opposed coupler units of a coupler in mating arrangement, whereby a five-point contact is established between each of the mating pairs of contactors.
Figure 19:
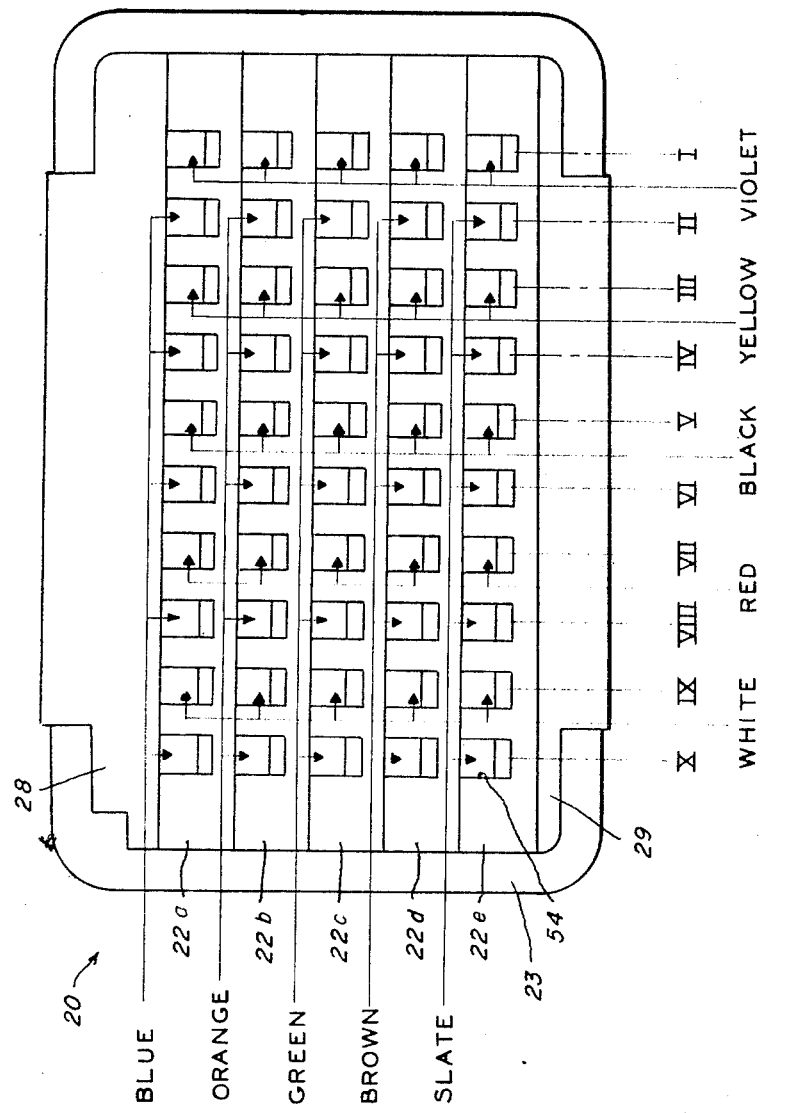
FIG. 19 is a diagrammatical view showing the location of color-coded twisted pairs of conductors relative to associated contactor-receiving cells of the coupler unit as viewed from the contact side of the unit.

As the intermediate wafers 22a–22e and side wafers 28 and 29 are assembled in a laminated stack, the flat face 30 of one wafer is positioned adjacent the slotted surface 35 of the adjacent wafer, whereby the slots 31—31 are enclosed to define contactor-receiving cells 54—54, as shown in FIGS. 2, 17 and 18. In addition, the flat surface 60 of the side wafer 28 cooperates with the adjacent, intermediate wafer 22 to enclose the slots 31 of the intermediate wafer, thereby forming contactor-receiving cells 54—54 with predetermined spacing between adjacent cells. Further, the cells 54—54 are displayed in individual rows formed by each wafer 22 as well as perpendicularly disposed columns formed by the combination of wafers where the columns are denoted by Roman numerals I through X as shown in FIG. 19. Thus, by forming the wafers 22—22 of the laminated stack with the keeper lugs 38 and 39 and the keeper notches 41 and 42, each wafer of the laminated assembly is precluded from lateral sliding movement relative to the remaining wafers. The projection 46 formed on the outer surface of the side wafer 28 and the projection 52 formed on the outer surface of the opposite side wafer 29 provide hand grips to facilitate manual movement of the mating coupler units 21—21 relative to the band 23. The outer end walls of the projections 46 and 52 are rounded and arranged for interference engagement with the inner end walls of the cut-aways 47—47, thus providing friction fits to hold the mating coupler units together within the band 23.

Generally the miniature contactors 24—24 are stamped from a stock strip in transverse multiples held on backbone cross strips supported by continuous stock side strips to facilitate handling of the miniature parts through subsequent necessary operations. Without this supported handling, the contactors 24—24 would tangle and mat together so that later separation would be tedious, time-consuming, injurious to the contactors and prohibitively expensive.

The backbone cross strips and the continuous stock side strips cooperate to provide means for holding the contactors 24—24 in suspended, parallel, spaced relationship while tines of the contactors are tin or gold plated. The backbone strips and continuous side strips provide an electrical path for the plating operation, and plate metal is conserved by plating only the contact end of the contactors.

The securing of the conductors 27—27 to the contactors 24—24 is facilitated by a soldering operation which is greatly facilitated with multiple contactors held in spaced relation on the backbone strip. Placement of the contactors 24—24 in a soldering device is much faster and more precise while lay-up of the color-coded conductors 27—27 of the unit cable 26 is simplified, and a plurality of the contactors held by a single backbone strip can be soldered simultaneously to respective cable conductors.

A coupler unit 21 embodying the features of the invention may be easily connected to conductors 27—27 at the extremities of a unit cable 26 at the manufacturing location, wherein the cable is wound on a reel and subsequently delivered to an installation group in the field for installing the cable in telephone distribution networks. With the aid of such a color-coded coupler unit 21, an installer need only insert the coupler unit connected to the trailing end of a cable 26 of a depleted supply reel to the mating coupler unit connected to the leading end of a cable of a new supply reel in accordance with the aligned colors of the colored, laminated wafers 22—22. This procedure obviates the time-consuming task of handsplicing the individual conductors of one cable to the individual conductors of another cable. Where unit cables 26—26 are combined to form a multiple unit group, side wafers 28 and 29, which are positioned at the opposite sides of the laminated wafer stack of the coupler unit 21, connected to a given unit cable, are composed of a colored material corresponding to the colors of the respective pair of binder tapes wound helically around the given unit cable. In addition, the method of fabricating and inserting the contactors 24—24 into the coupler units 21—21 at the manufacturing location requires considerably less time than is required for the hand-splicing operation by the installer in the field. Thus, the overall time required for the connecting operation is greatly reduced by the utilization of the coupler 20 and the method of fabrication of the coupler and effectively reduces associated time delays to customer service.

Figure 11:
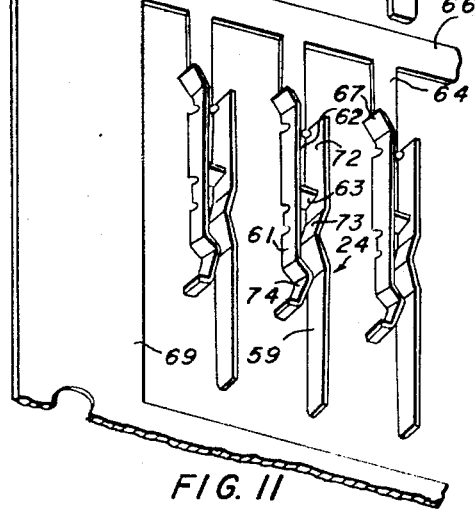
FIG. 11 is a partial perspective view of a metal strip showing the major steps of blanking and forming a contactor from the strip.

Specifically, the contactors 24—24 (FIG. 2), which are utilized in the coupler unit 21 are stamped from an elongated metal strip 56, as shown in FIG. 11, wherein the strip is provided with a series of perforations 57—57 along the border edges thereof to receive means for moving and aligning the strip during subsequent blanking and forming steps. As the strip 56 is guided through a punching press (not shown), the strip is punched transversely into a plurality of patterned blanks, generally designated by the reference numeral 58. Each blank 58 is formed with a long tine 59 and a short tine 61 bridged at their heel ends by a central web section 62 which holds the tines in parallel, cantilever relationship. A tab 63 extends from the central web section 62 spatially between the tines 59 and 61. At the opposite end of the web section 62, a rib strip 64 connects the patterned blank 58 to a commonly supporting, transverse backbone strip 66. Further, a tab 67 extends rearwardly from the short tine 61 spatially adjacent the rib strip 64. The rib strip 64 is scored at 68 near the web 62 for subsequent removal of the individual contactors 24 from the rib strip and the backbone strip 66. A plurality of backbone strips 66—66, each supporting a plurality of spaced patterned blanks 58—58, are spatially formed from the strip 56 and are supported by and extend transversely between spaced skeleton side strips 69—69 (one shown).

Figure 12:
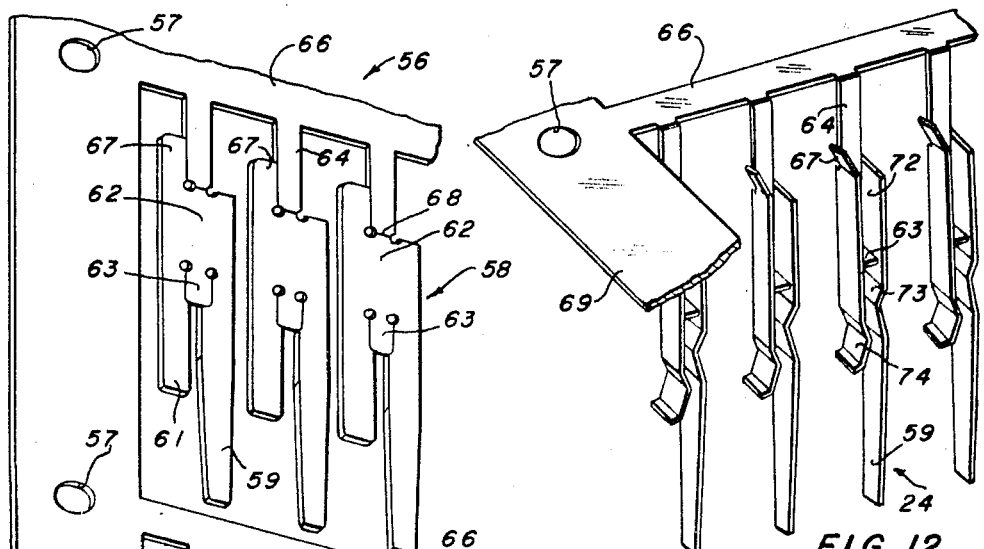
FIG. 12 is a partial perspective view of a plurality of formed contactors bent downwardly and held in a spaced relation by a backbone strip supported by a skeleton rib.

The side strips 69—69 with the blanks 58—58 and the backbone strips 66 are subsequently fed into forming dies (not shown), wherein the long tine 59, the tab 53 and the short tine 61 with the tab 67 of each contactor 24 are bent upwardly, as shown in FIG. 11, to form a pocket 72 in the area of the web section 62 for reception of an exposed end of one of the conductors 27—27. Thus, the long and short tines 59 and 61 extend integrally from side walls of the pocket 72. In addition, each of the long tines 59—59 is crimped slightly to form an intermediate ramp 73, while each of the short tines 61—61 is formed at the free end thereof with a hooked ramp 74. The rearward tab 67 is bent outwardly away from the neck portion 64 and angularly extends from the pocket side wall which is integral with the short tine 61. Subsequently, as viewed in FIG. 12, the side strips 69—69 with the formed contactors 24—24 and the backbone strips 66—66 are positioned within a bending die (not shown), wherein the rib strips 64—64 supporting the formed contactors are bent downwardly at a right angle relative to the backbone strips. The side strips 69—69 are moved into a plurality of stations (not shown) whereat the backbone-held contactors 24—24 are degreased and cleaned, heat treated, pickled and gold-plated, and washed and dried to greatly increase the resiliency an fatigue life of the contactors and improve electrical contact.

Figure 13:
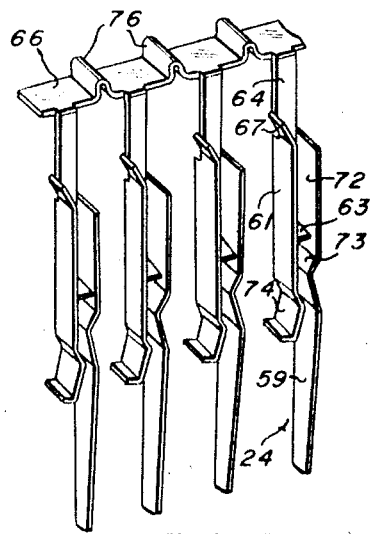
FIG. 13 is a partial perspective view showing the contactors held in a spaced relation by the crimped backbone strip to facilitate a more closely aligned spacing between adjacent contactors.

The side strips 69—69 with the formed, downwardly suspended contactors 24—24 are then passed into a crimping and cutting press (not shown), wherein the backbone strip 66 is crimped, as shown in FIG. 13, in areas 76 between each of the spatially supported contactors, thereby reducing the spacing between adjacent contactors. The reducing of the spacing between the contactors 24—24 is necessary to facilitate a subsequent soldering operation and insertion of the contactors into the precisely spaced cells 54—54 of the coupler unit 21. The backbone strips 66—66 are sequentially severed from the skeleton side strips 69—69 and the free backbone strips are successively and automatically directed into a compartmented container (not shown) to facilitate handling and transporting of the backbone-supported, miniature, fragile contactors 24—24 into a soldering station where the cable conductors 27—27 are assembled and secured with the contactors. The magazining of the backbone-supported contactors 24—24 into containers minimizes damage to, or mutilation of, the miniature contactors during the handling and transportation thereof.

Figure 14:
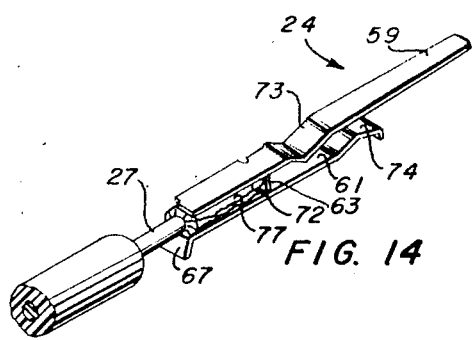
FIG. 14 is a perspective view showing a single insulated conductor secured with a contactor.

The backbone-held contactors 24—24 are positioned and held in a soldering and cutting apparatus (not shown), such as that disclosed in a copending application in the name of H. E. Brent, Ser. No. 419,132, which was filed on Dec. 17, 1964, now U. S. Patent 3,252,644 and issued on May 24, 1966, wherein a plurality of the conductors 27—27 of the unit cable 26 are assembled and held in the pockets 72—72 formed by the tines 49 and 51 and the tab 53. Thereafter, the pockets 72—72 are heated and individual solder strands (not shown) are inserted into each respective, heated pocket 72, whereby the solder melts upon engagement with the pocket. Upon cooling of the solder, the conductors 27—27 are secured within the respective contactor pockets 72—72 by a solidified solder 77 (FIGS. 14, 17 and 18). By depositing the cold solder directly into the heated pockets 72—72, the solder is prevented from forming on the outer surfaces of the pockets which could subsequently interfere with the close fit of the contactor 24 within the cells 54—54 of the coupler units 21—21 and also undesirably bridge adjacent contactors.

Subsequent to the soldering operation, the apparatus automatically and transversely severs the backbone strip 66 into selected segments with each segment supporting five contactors 24—24. Hence, a unit cable 26 of twenty-five conductor pairs would be secured with ten backbone segments with each segment supporting five contactors 24—24 having five respective conductors 27—27 secured therewith.

The conductors 27—27 are soldered to the contactors 24—24 in accordance with the previously discussed color-code arrangement, whereby each of the conductors which form a twisted pair is soldered to contactors which are subsequently secured in adjacent cells 54—54 of the contactor-supporting coupler unit 21. Thereafter, the backbone-held contactors 24—24, having the paired conductors 27—27 of the unit cable 26 secured thereto, are inserted into and self-secured within the cells 54—54 of the contactor-supporting coupler unit 21 where the hooked ramp 74 initially engages the sloped surface 34 to facilitate flexing of the short tine 61 during the insertion procedure.

The spacing between adjacent cells 54—54 of the coupler unit 21 is determined by the spacing of the wafer slots 31—31 which is small due to the miniature size of the coupler unit. In the formation of the contactors 24—24, sufficient material must be provided between adjacent contactor blanks 58—58 (FIG. 11) to facilitate the formation of the contactor elements. However, the necessary spacing between adjacent blanks 58—58 is greater than the critical spacing between adjacent cells 54—54. Hence, the necessity for crimping the backbone strip 66 in the areas 76 (FIG. 13) is to reduce the spacing between the formed contactors 24—24 so that the contactor spacing coincides with the cell spacing to facilitate the gang insertion of the contactors into the coupler unit cells 54—54.

TABLE 2

| Contactor No. | Conductor Color | Segment No. |
|---|---|---|
| 1 | Blue | |
| 2 | Orange | |
| 3 | Green | X |
| 4 | Brown | |
| 5 | Slate | |
| 6 | White | |
| 7 | do | |
| 8 | do | IX |
| 9 | do | |
| 10 | do | |
| 11 | Blue | |
| 12 | Orange | |
| 13 | Green | VIII |
| 14 | Brown | |
| 15 | Slate | |
| 16 | Red | |
| 17 | Red | |
| 18 | Red | VII |
| 19 | Red | |
| 20 | Red | |
| 21 | Blue | |
| 22 | Orange | |
| 23 | Green | VI |
| 24 | Brown | |
| 25 | Slate | |

TABLE 3

| Contactor No. | Conductor Color | Segment No. |
|---|---|---|
| 50 | Violet | |
| 49 | do | |
| 48 | do | I |
| 47 | do | |
| 46 | do | |
| 45 | Slate | |
| 44 | Brown | |
| 43 | Green | II |
| 42 | Orange | |
| 41 | Blue | |
| 40 | Yellow | |
| 39 | do | |
| 38 | do | III |
| 37 | do | |
| 36 | do | |
| 35 | Slate | |
| 34 | Brown | |
| 33 | Green | IV |
| 32 | Orange | |
| 31 | Blue | |
| 30 | Black | |
| 29 | do | |
| 28 | do | V |
| 27 | do | |
| 26 | do | |

The backbone strip 66 supports, for example, twenty-five contactors 24—24 in the manner as shown in FIG. 13. A method of assembling the conductors 27—27 of the twenty-five color coded, twisted pairs of the unit cable 26 with the contactors 24—24 includes holding the backbone strip 66 to facilitate assembly and soldering of the individual conductors within the pockets 72—72 of the contactors. As displayed in Table No. 2, numbers one through twenty-five have been assigned to the twenty-five successive contactors 24—24, held by the common backbone strip 66, which are assembled with a first group of twenty-five respective conductors 27—27 of the fifty-conductor unit cable 26 in accordance with the pattern as outlined in the Table No. 2. In this manner, the five contactors 24—24 of each of three groups having contactors which are numbered one through five, eleven through fifteen and twenty-one through twenty-five are assembled with conductors having colored insulation of the second group of colors; namely, blue orange, green, brown and slate, respectively. The five contactors 24—24 numbered six through ten are assembled, respectively, with the five conductors 27—27 having white colored insulation. The remaining five contactors 24—24 numbered sixteen through twenty are assembled, respectively, with the five conductors having the red colored insulation. A second group of twenty-five conductors 27—27 of the fifty-conductor unit cable 26 are assembled with the contactors 24—24 held by another backbone strip 66 in accordance with the pattern as shown in Table No. 3 wherein the number assignment and color scheme follows a similar pattern as that described for Table No. 2.

Subsequent to the assembly of the first twenty-five conductors 27—27 with the contactors 24—24 in accordance with the pattern shown in Table No. 2, the conductors are secured within the individual pockets 72—72 of the respective contactors. It is noted that contactors 24—24, which are numbered one and six, are assembled with the conductors 27—27 which form the blue-white conductor pair; the contactors numbered two and seven are assembled with the orange-white conductor pair; the contactors numbered three and eight are assembled with the green-white conductor pair and so on. Further, the contactors 24—24, which are numbered eleven and sixteen, are assembled with the blue-red conductor pair; the contactors numbered twelve and seventeen are assembled with the orange-red conductor pair and so on.

As previously discussed, another backbone strip 66 supports the second group of twenty-five contactors 24—24 wherein the contactors are numbered twenty-six through fifty and are assembled with the remaining twenty-five conductors 27—27 of the fifty-conductor unit cable 26 in the manner as set forth in Table No. 3. It is noted that the conductors 27—27, which are assembled with the contactors 24—24 numbered twenty-one and twenty-six in Tables 2 and 3, respectively, form the blue-black pair; the conductors assembled with the contactors numbered twenty-two and twenty-seven form the orange-black pair and so on. Further, the conductors 27—27 assembled with the contactors 24—24 numbered thirty-one and thirty-six in Table No. 3 form the blue-yellow pair, and so on; while the conductors assembled with the contactors numbered forty-one and forty-six in Table No. 3 form the blue-violet pair, and so on.

Subsequent to the assembly of the fifty conductors 27—27 of the unit cable 26 with the contactors 24—24 numbered one through fifty in accordance with the pattern shown in Tables 2 and 3, the backbone strips 66—66 supporting the two groups of twenty-five contactors are each transversely severed along four spaced planes to provide ten backbone supported segments designated by Roman numerals I through X in Tables 2 and 3 wherein each segment supports five contactors with the conductors assembled and secured therewith. For example, the segment I of five assembled conductors 27—27 and contactors 24—24 includes the contactors numbered forty-six through fifty having the conductors with violet colored insulation secured therewith. As a further example, the segment II of five backbone-supported, assembled conductors 27—27 and contactors 24—24 includes the contactors numbered forty-one through forty-five assembled and secured with conductors having blue, orange, green, brown and slate colored insulation, respectively. This segment pattern is continued as shown in Tables 2 and 3.

Referring to Tables No. 2 and 3, the backbone-supported segment I, supporting the five contactors 24—24 numbered forty-six through fifty which are secured with the conductors having the violet colored insulation, is aligned with the column I of cells 54—54 which is the first column from the right of the coupler unit 21 as viewed in FIG. 19. The segment I is moved toward the coupler unit 21 so that the contactors 24—24 are inserted into the cells 54—54 of the column I in such a manner that the backbone strip of the segment projects to the left as viewed in FIG. 19 and is substantially parallel with the face of the conductor side of the coupler unit. Subsequent to the insertion of the contactors 24—24 of the segment I into the cells 54—54 of the column I, the backbone strip of the segment I is flexed to separate the rib strips 64—64 from the respective contactors along the scored lines 68—68.

The five contactors numbered forty-one through forty-five asembled with conductors 27—27 having blue, orange, green, brown and slate colored insulation, respectively, and which are supported by the backbone segment II, are inserted into the column II of cells 54—54 which is the second column from the right of the coupler unit 21 as viewed in FIG. 19. The contactors 24—24 of segment II are assembled in the cells 54—54 of the column II in such a manner that the backbone strip of the segment projects to the left, as viewed in FIG. 19, parallel to the face of the conductor side of the coupler unit 21. By assembling the contactors 24—24 of the segment II in this manner, the backbone of the segment projects away from the previously assembled segment I rather than projecting between the assembled segments I and II. Assembly of the segments in this manner facilitates easy gripping and flexing of the segment backbone to separate the rib strip 64 from the contactors 24—24 along the scored lines 68—68. This assembly procedure precludes the necessity of flexing the backbone of the segments between assembled segments which could be cumbersome and difficult. In this manner, the five contactors 24—24 of segment II, which are assembled with conductors having blue, orange, green, brown and slate colored insulation, are inserted into the cells 54—54 of the column II formed by the intermediate wafers 22a through 22e which are composed of the colors blue, orange, green, brown and slate, respectively.

Thus, the contactor 24, which is numbered forty-one in Table No. 3, and which is secured with the conductor having the blue insulation, is inserted into the cell 54 which is coincident with the row of cells formed by the blue intermediate wafer 22a and the cells formed by Column II; the contactor numbered forty-two which is secured with the conductor having the orange colored insulation is inserted into the cell which is coincident with the row of cells formed by the orange intermediate wafer 22b and the cells formed by Column II; the contactor numbered forty-three, which is secured with the conductor having the green insulation, is inserted into the cell which is coincident with the row of cells formed by the green intermediate wafer 22c and the cells formed by Column II, and so on. Further, the contactors 24—24 of the segments I and II are assembled in the respective cells 54—54 of the columns I and II in such a manner that the blue-violet pair of conductors 27—27, which are secured to contactors numbered forty-one and forty-six (Table No. 3), respectively, occupy adjacent cells of the row of cells formed by the intermediate blue wafer 22a. The orange-violet pair of conductors 27—27 are secured to contactors 24—24, numbered forty-two and forty-seven (Table No. 3), respectively, which occupy adjacent cells 54—54 of the row of cells formed by the intermediate orange wafer 22b. This pattern of assembly is followed with the remaining violet colored conductor pairs. Further, the remaining segments III through X are assembled with the coupler unit 21 in a similar pattern, whereby pairs of the contactors 24—24 secured with the respective paired conductors 27—27 occupy adjacent coupler cells 54—54 of the rows of cells formed by the respective, individual wafers 22—22 as shown in FIG. 19.

In addition, it is noted that the pairs of conductors 27—27, having one conductor with blue insulation, are secured with contactors 24—24 which are inserted into and occupy the cells 54—54 of the row of cells formed by the blue wafer 22a; the pairs of conductors having one conductor with orange insulation are secured with contactors which are inserted into and occupy alternate cells of the row of cells formed by the orange wafer 22b, and so on. Further, each group of five conductors 27—27 each, having insulation of the second group, namely, white, red, black, yellow and violet, respectively, are secured with contactors 24—24 which occupy cells 54—54 in alternate columns of cells formed by the stacked rows of cells not occupied by contactors secured to conductors having colored insulation of the first group.

Referring to FIG. 17, as each contactor 24 is inserted into one of the cells 54—54 of the coupler unit 21, the long tine 59 is moved through and protrudes from the cell in a cantilever fashion. In addition, the hooked ramp 74 is flexed in the cell 54 and moves along the bed 33 of the cell until the free end of the hooked ramp engages and locks against the transverse undercut 36, thereby preventing rearward movement of the contactor 24 within the cell. Further, the rearward tab 67 engages the sloped surface 34 to limit continued forward movement of the contactor 24 within the cell 54. Thus, the contactors 24—24 are positioned within the cells 54—54 and are prevented from slideable movement within the cells due to cooperative structural features of the contactors and the coupler cells, whereby the contactors are located within the coupler unit 21 in a self-secured fashion.

As further shown in FIG. 17, the intermediate ramp 73 of the long tine 59, urges the long tine upwardly against the wall of the cell 54 formed by the flat surface 30 of the adjacent wafer 22, thereby providing resiliency in the extended end of the tine which protrudes from the coupler unit 21. This resilient feature aids in the subsequent flexing of the extended end of the tines 59—59 when the coupler unit 21 is mated with another identical coupler unit.

It is noted that each of the contactors 24—24 can be removed from within the respective cell 54 by inserting a needle-like implement into the contactor end of the cell, engaging the free end of the hooked ramped 74 and thereafter lifting the ramp over the transverse undercut 36. The contactor 24 is thereafter withdrawn from the conductor end of the cell 54 by sliding the flexed tines 59 and 61 from within the cell and appears as shown in FIG. 14. This feature facilitates interchangeability of the contactors 24—24 necessitated by circuit changes and can be effected at any location, for example, at the manufacturing facility or in the field.

Referring to FIG. 18, one of the contactor-supporting, assembled coupler units 21—21 is inserted into one end of the band 23, whereby the close fit of the wafers 22—22 within the band facilitates alignment of the contactors 24—24 of the coupler unit for subsequent mating engagement with the contactors of the mating coupler unit. In addition, the coupler unit keyway 45 and the complementary band key 50 assure proper orientation of the wafered coupler unit 21 as the unit is inserted into the band 23 to mate with the identical coupler unit inserted from the opposite side of the band. The key 50 and keyway 45 precludes the possibility of the coupler units 21—21 being inserted into the band 23 in an incorrect orientation which could result in matting and tangling of the mating contactors 24—24 possibly resulting in permanent damage.

As the pair of coupler units 21—21 are inserted into the band 23, the cantilevered long tines 59—59 of each contactor 24 of one coupler unit are inserted into the contactor end of opposing cells 54—54 between the spaced long and short tines 59 and 61 of the mating coupler unit and subsequently engage and are flexed by the ramps 73 and 74 of the contactors of the mating coupler unit. The engagement of the cantilevered tines 59—59 with the ramps 73 and 74 of the mating contactor 24 flexes each of the tines into a substantially bow shape, whereby the tines 59—59 of one coupler unit engage the tines 59—59 of the mating coupler unit at an intermediate portion thereof, thereby establishing a five-point contact between each pair of mating contactors of the coupler units. In this manner, the contacting surfaces of the contactors 24—24 establish a plurality of areas for contact, thereby insuring a good electrical connection.

Thus, the connecting of color-coded pairs of conductors 27—27 of one cable 26 with identically color-coded pairs of conductors of another cable is readily accomplished by stacking the colored laminate wafers 22—22 in a selected color-coded pattern to form the coupler units 21—21, inserting the conductor-supporting contactors 24—24 into cells 54—54 of the coupler unit in accordance with the previously discussed color-code arrangement, and thereafter mating the contactor-supporting coupler units in such a manner that the colored wafers of one unit are aligned with the mating unit wafers of the same colors.

Further, in the event the hooked ramp 74 of the short tine 61 is not completely resting within the undercut 36, the pressure exerted upon the ramp by the long tine 59 of the entering mating contactor 24 is sufficient to urge the ramp completely into the undercut as shown in FIG. 18. As the mating coupler units 21—21 engage, the coupler units are frictionally held within the plastic band 23 (FIGS. 1 and 18) whereby the laminated, intermediate wafers 22—22 and the side wafers 28 and 29 are precluded from individual movement in any direction. It is noted that the cantilevered end of each of the tines 59—59 is tapered inwardly to facilitate the alignment of the contactors 24—24 as the contactors enter into the cells 54—54 of the mating coupler unit 21.

Subsequent to the assembly of the contractor 24—24 within the coupler unit 21 and the further insertion of the coupler unit into one end of the band 23, the unit cable 26 and the respective coupler unit are prepared for shipment whereby a disposable dust cover 78, as shown in FIGS. 15 and 16, is inserted into the open end of the band 23. The cover 78 has a container-like shape such as a plastic shell 79 with a closed end 81 where the outer shell conforms substantially to the outer configuration of the assembled, laminated coupler unit 21. The dust cover 78 is further formed with projections 82—82 which protrude from opposite sides of the shell 79 adjacent the closed end 81. Recesses 83—83 are formed in the outer portion of the closed end 81 where the projections join the shell 79, thereby facilitating resilient gripping of the dust cover 78 and further reducing the effects of heat sink during molding of the cover. In addition, the dust cover 78 is formed with a keyway 80 which is complementary with the band key 50 to facilitate insertion of the cover into the band.

As the dust cover 78 is inserted into the open end of the band 23, the open end of the shell 79 is guided about the cantilevered tines 59—59 extending from the coupler unit 21 which is positioned in the opposite open end of the band, thereby protecting the tines from accidental bending and damage during transportation of the assembled unit. The arrangement of the dust cover 78 within the band 23 also provides a substantially dust-free enclosure for the coupler unit elements, thereby preventing damage to and an accumulation of dust on the contractors 24—24.

As noted, each coupler unit 21 is assembled within one end of the band 23 with a dust cover 78 inserted into the other end. When the coupler 20 is to be assembled in the field, an installer removes and discards the dust cover 78 from within the band 23 which supports the coupler unit 21 assembled with the end of one of the cables 26—26. Thereafter, the installer removes from another band 23 the coupler unit 21 assembled with the end of another cable 26 and inserts this coupler unit into the open end of the first band for mating assembly with the coupler unit in the opposite end of the band, thereby completing the coupling procedures.

While the conductor-supporting contractors 24—24 are assembled with the wafered coupler units 21—21 in the manner previously discussed, poling frequently occurs wherein the colored wafers 22a–22e of one coupler unit do not align with the corresponding colored wafers of the mating coupler unit when the coupler units are inserted into the band 23. This is an indication to the installer that the wafers 22a–22e of the coupler units 21—21 are not properly oriented for accomplishing the desired coupling and that poling has resulted. In the event such poling occurs, the installer merely removes one of the coupler units 21—21 from within the band 23 and restacks the individual wafers 22a–22e relative to the side wafers 28 and 29 to obtain the required wafer color alignment and thereafter inserts the reoriented coupler unit into the band 23 to facilitate the desired coupling.

To facilitate reorientation of the wafers 22a–22e for obtaining proper color alignment, the installer selects one of the coupler units 21—21 and separates the side wafer 29 from the remaining wafers. Thereafter, the installer carefully separates the first wafer 22, which was adjacent the removed side wafer 29, and assembles the removed wafer 22 with a spare side wafer 28. It is noted that the contractors 24—24, which are assembled within the cells 54—54 formed by the removed wafer 22, will remain with the wafer, thereby retaining the desired contractor assembly for that row of cells. The next succeeding wafer 22 is removed from the original stack and is assembled with the first removed wafer with the assembled contractors 24—24 remaining with the transferred wafer. This pattern is continued until the wafers 22—22 of the removed coupler unit 21 have been reoriented to facilitate proper color alignment of the wafers 22a–22e for proper mating with the other coupler unit 21 within the band 23. Hence, the wafer structure of the coupler units 21—21 readily facilitates reorientation of the colored wafers 22a–22e where such reorientation is necessary to accomplish the desired coupling.

It is to be noted that the color-code arrangement and related numerical designations disclosed herein is merely representative of one of many color and numerical schemes which could be incorporated into such a color-code system. Further, the coupler unit 21 can be easily modified to facilitate the reception of other combinations and numbers of terminals and is thereby not limited to the arrangement disclosed herein. It is to be further understood that the above-described ararngements are simply illustrative of the principles of the invention. Other arrangements may be devised by those skilled in the art which will embody the principles of the invention and fall within the spirit and scope thereof.

What is claimed is:

1. A method of fabricating an electrical coupler unit, which comprises the steps of:

assembling a plurality of slotted laminate wafers to form a series of contactor-receiving cells, stamping a metal strip to form a plurality of contactors held in a spaced relation by a backbone strip, holding the backbone strip to facilitate a simultaneous securing of a plurality of conductors with the plurality of backbone-held contactors, securing the conductors with the contactors, breaking the backbone strip into sections to provide a plurality of segments of backbone-held contactors having conductors secured therewith, inserting the contactors of the backbone-supported segments into the cells formed by the laminate wafers, and removing the backbone strip of each segment so that the contactors are individually held within the cells.

2. A method of fabricating and inserting conductor-supporting contactors into cells of an electrical coupler unit, which comprises the steps of:

stamping a metal strip to form a plurality of contactor blanks held in a spaced relation by a backbone strip, folding the blanks into a desired contactor configuration having a conductor-receiving pocket with tines extending therefrom, positioning the backbone strip so that the pockets of the contactors held by the strip are positioned for the reception of conductors therein, positioning individual conductors into each of the pockets, securing the conductors within the respective contactor pockets, breaking transversely the backbone strip into segments wherein each segment supports a plurality of contactors having conductors secured therewith, inserting the contactors of each of the backbone-held segments into the cells of the coupler unit so that the contactors are self-secured therein, and removing the backbone strip from each segment of contactors, whereby the contactors are individually held within the cells.

3. A method of fabricating an electrical coupler unit, which comprises the steps of:

forming a coupler unit having contactor-receiving cells with predetermined spacing between adjacent cells, stamping tranversely a strip of metal to form a plurality of contactors held in a spaced, side-by-side relation by a backbone strip with spacing between adjacent blanks being greater than the spacing between adjacent cells, reducing the spacing between adjacent contactors on the backbone strip, whereby the spacing between the contactors coincides with the cell spacing to facilitate subsequent gang-insertion of the contactors into coupler unit cells, inserting the backbone-held contactors into the coupler unit cells, and removing the backbone from the contactors to provide individual contactors supported by the coupler unit.

4. A method of fabricating an electrical coupler unit with conductors connected thereto, which comprises the steps of:
- forming a coupler unit having contactor-receiving cells with predetermined spacing between adjacent cells,
- stamping transversely a strip of metal to form a plurality of contactors held in a spaced, side-by-side relation by a backbone strip with spacing between adjacent blanks being greater than the spacing between adjacent cells,
- reducing the spacing between adjacent contactors on the backbone strip, whereby the spacing between the contactors coincides with the cell spacing to facilitate subsequent gang-insertion of the contactors into coupler unit cells,
- assembling individual conductors with each of the contactors supported by the backbone,
- securing the assembled conductors with the respective contactors,
- inserting the backbone-held contactors into the coupler unit cells, and
- removing the backbone from the contactors to provide individual contactors having conductors secured thereto.

5. A method of fabricating an electrical coupler unit with a plurality of conductors connected thereto, which comprises the steps of:
- forming a coupler unit having contactor-receiving cells with predetermined spacing between adjacent cells,
- stamping a strip of metal to form a plurality of contactor blanks held in a spaced, side-by-side relation by a backbone strip with spacing between blanks being greater than the spacing between adjacent cells,
- folding the blanks to form the contactors in a desired configuration,
- crimping the backbone strip in the areas between the backbone-held contactors, whereby the spacing between the contactors coincides with the cell spacing for facilitating subsequent gang-insertion of the contactors into the coupler cells,
- holding the crimped backbone strip to facilitate the assembly of the plurality of conductors with the contactors,
- securing the conductors with the respective contactors,
- inserting the backbone-held contactors into the coupler unit cells, and
- removing the backbone strip from the plurality of contactors to provide individual contactors having conductors secured thereto.

References Cited

UNITED STATES PATENTS

| | | | |
|---|---|---|---|
| 2,326,327 | 8/1943 | Brewer | 339—49 |
| 2,631,211 | 3/1953 | Klay. | |
| 2,727,299 | 12/1955 | Klumpp. | |
| 3,170,233 | 2/1965 | Oldenburg et al. | 29—418 |
| 3,072,340 | 1/1963 | Dean | 339—49 |
| 3,178,802 | 4/1965 | Foreman | 29—155.55 X |
| 3,182,276 | 5/1965 | Ruehlemann | 29—155.5 X |

FOREIGN PATENTS

| | | |
|---|---|---|
| 478,189 | 1/1938 | Great Britain. |
| 960,997 | 6/1964 | Great Britain. |

JOHN F. CAMPBELL, Primary Examiner

C. E. HALL, Assistant Examiner

U.S. Cl. X.R.

29—418, 630; 339—258, 276